United States Patent
Wirth et al.

(10) Patent No.: US 9,871,877 B2
(45) Date of Patent: Jan. 16, 2018

(54) SOCIALLY AUGMENTED BROWSING OF A WEBSITE

(71) Applicant: Evergage, Inc., Somerville, MA (US)

(72) Inventors: Karl Wirth, Bedford, MA (US); Greg Hinkle, Westford, MA (US); Chris Phelan, Weymouth, MA (US)

(73) Assignee: Evergage, Inc., Somerville, MA (US)

( * ) Notice: Subject to any disclaimer, the term of this patent is extended or adjusted under 35 U.S.C. 154(b) by 219 days.

(21) Appl. No.: 14/820,660

(22) Filed: Aug. 7, 2015

(65) Prior Publication Data

US 2016/0044119 A1 Feb. 11, 2016

Related U.S. Application Data

(60) Provisional application No. 62/035,112, filed on Aug. 8, 2014.

(51) Int. Cl.
*G06F 15/16* (2006.01)
*H04L 29/08* (2006.01)
*G06F 17/30* (2006.01)

(52) U.S. Cl.
CPC .............. *H04L 67/22* (2013.01); *G06F 17/30* (2013.01); *H04L 67/02* (2013.01)

(58) Field of Classification Search
CPC .......... H04L 67/22; H04L 67/02; G06F 17/30
See application file for complete search history.

(56) References Cited

U.S. PATENT DOCUMENTS

| | | | |
|---|---|---|---|
| 7,254,552 B2 | 8/2007 | Bezos | |
| 7,478,054 B1 | 1/2009 | Adams | |
| 8,510,253 B2* | 8/2013 | Anderson | G06Q 30/02 706/52 |
| 8,527,596 B2* | 9/2013 | Long | G06Q 30/02 709/204 |
| 8,615,377 B1* | 12/2013 | Yuen | H04L 67/22 702/160 |
| 9,288,298 B2* | 3/2016 | Choudhary | H04L 51/00 |
| 9,421,422 B2* | 8/2016 | Yuen | H04W 4/023 |
| 9,503,538 B2* | 11/2016 | Narasimha | H04L 67/22 |
| 2006/0173702 A1 | 8/2006 | Saxena | |
| 2010/0318491 A1* | 12/2010 | Anderson | G06Q 30/02 706/52 |
| 2011/0113096 A1* | 5/2011 | Long | G06Q 30/02 709/204 |

(Continued)

*Primary Examiner* — Moustafa M Meky
(74) *Attorney, Agent, or Firm* — Blueshift IP, LLC; Robert Plotkin

(57) ABSTRACT

A computer system enables users of an Internet application (such as a web site or a mobile application) to specify that they wish to be members of one or more groups. The computer system provides the user with information about activities performed by other users who are members of the same group as the user. For example, the computer system may inform a user of the web pages currently being viewed and/or recently viewed by other users who are members of the same group(s) as the user. Examples of other information that the computer system may inform the user about include amount of time spent by other users in the same group on particular web pages, content shared by those users, and products purchased by those users. Groups may be created by the users themselves and/or by the administrators of the Internet application.

38 Claims, 6 Drawing Sheets

(56) References Cited

U.S. PATENT DOCUMENTS

| | | | |
|---|---|---|---|
| 2011/0307403 A1* | 12/2011 | Rostampour | G06Q 50/265 |
| | | | 705/325 |
| 2012/0072304 A1 | 3/2012 | Homan | |
| 2012/0221387 A1* | 8/2012 | Liu | G06Q 50/01 |
| | | | 705/14.16 |
| 2013/0041781 A1 | 2/2013 | Freydberg | |
| 2013/0311556 A1* | 11/2013 | Srivastava | G06Q 50/01 |
| | | | 709/204 |
| 2016/0070449 A1* | 3/2016 | Christiansen | G06F 17/30867 |
| | | | 715/765 |

* cited by examiner

FIG. 3D

SOCIALLY AUGMENTED BROWSING OF A WEBSITE

BACKGROUND

The earliest web sites consisted of static pages containing content such as journal articles and essays. Every user who visited such sites was presented with the same content. Such web sites, therefore, provided an experience similar to reading a copy of a printed book or newspaper.

Not long after the advent of the World Wide Web, however, technology was developed which made it possible to personalize certain aspects of web site content. Some of the earliest incarnations of such personalization technologies enabled users to specify the categories of content to appear on a web page (such as sections for news, weather, sports, and entertainment), and to specify where on the web page each such category of content was to appear, such as by dragging the weather section to the upper left of the page and the sports section to the upper right. After such an initial setup, each user would be presented with his or her own personalized version of the page in which both the content and the layout of the page varied from user to user.

Since that time, many more technologies have been developed for personalizing both the content that appears on a web page to a particular user and for personalizing other aspects of the web browsing experience. Furthermore, social media applications, such as Facebook and Twitter, enable people to form online social networks and to share content and engage in shared activities with each other online. These and other developments have resulted in an increasingly varied and diverse range of online experience, in which both the content and functionality designed by Internet application developers and the activities and preferences of users themselves combine to influence both the content with which users are presented and the actions that users are able to take online.

One of the features of social media applications that has proven most popular with users and most useful to social media companies is the ability to inform users of certain actions taken by certain other users. For example, Facebook may inform a first user that a second user in the first user's social network has "liked" the Starbucks web site, such as by posting a message saying that "John Smith likes Starbucks" on the first user's Facebook wall. The ability to inform users of the online activity of other users, however, is limited in its ability to provide useful and actionable information.

SUMMARY

A computer system enables users of an Internet application (such as a web site or a mobile application) to specify that they wish to be members of one or more groups. The computer system provides the user with information about activities performed by other users who are members of the same group as the user. For example, the computer system may inform a user of the web pages currently being viewed and/or recently viewed by other users who are members of the same group(s) as the user. Examples of other information that the computer system may inform the user about include amount of time spent by other users in the same group on particular web pages, content shared by those users, and products purchased by those users. Groups may be created by the users themselves and/or by the administrators of the Internet application.

For example, an embodiment of the present invention is directed to a method comprising receiving, from a particular user, an input selecting a group of users from among all users of an Internet application; adding the particular user to the group of users; tracking online behavior of the group of users, including the particular user, in connection with the Internet application; and displaying, to the particular user, information representing the tracked online behavior of the group of users. The information representing the tracked online behavior of the group of users does not include information representing tracked online behavior of users outside of the group of users.

Other features and advantages of various aspects and embodiments of the present invention will become apparent from the following description and from the claims.

BRIEF DESCRIPTION OF THE DRAWINGS

FIGS. 3A-3D are illustrations of user interfaces implemented according to various embodiments of the present invention.

DETAILED DESCRIPTION

Embodiments of the present invention enable users of web sites and other Internet applications to identify themselves with one or more groups of users and to view information about the behavior of such groups of users on those web sites and other Internet applications. For example, embodiments of the present invention enable a user to join a group of users with a similar interest (such as gardening), in response to which embodiments of the present invention may present the user with information about the Internet behavior of the users in the joined group, such as information about web site pages that the users in the joined group have viewed and products that users in the joined group have purchased.

Figure 1:
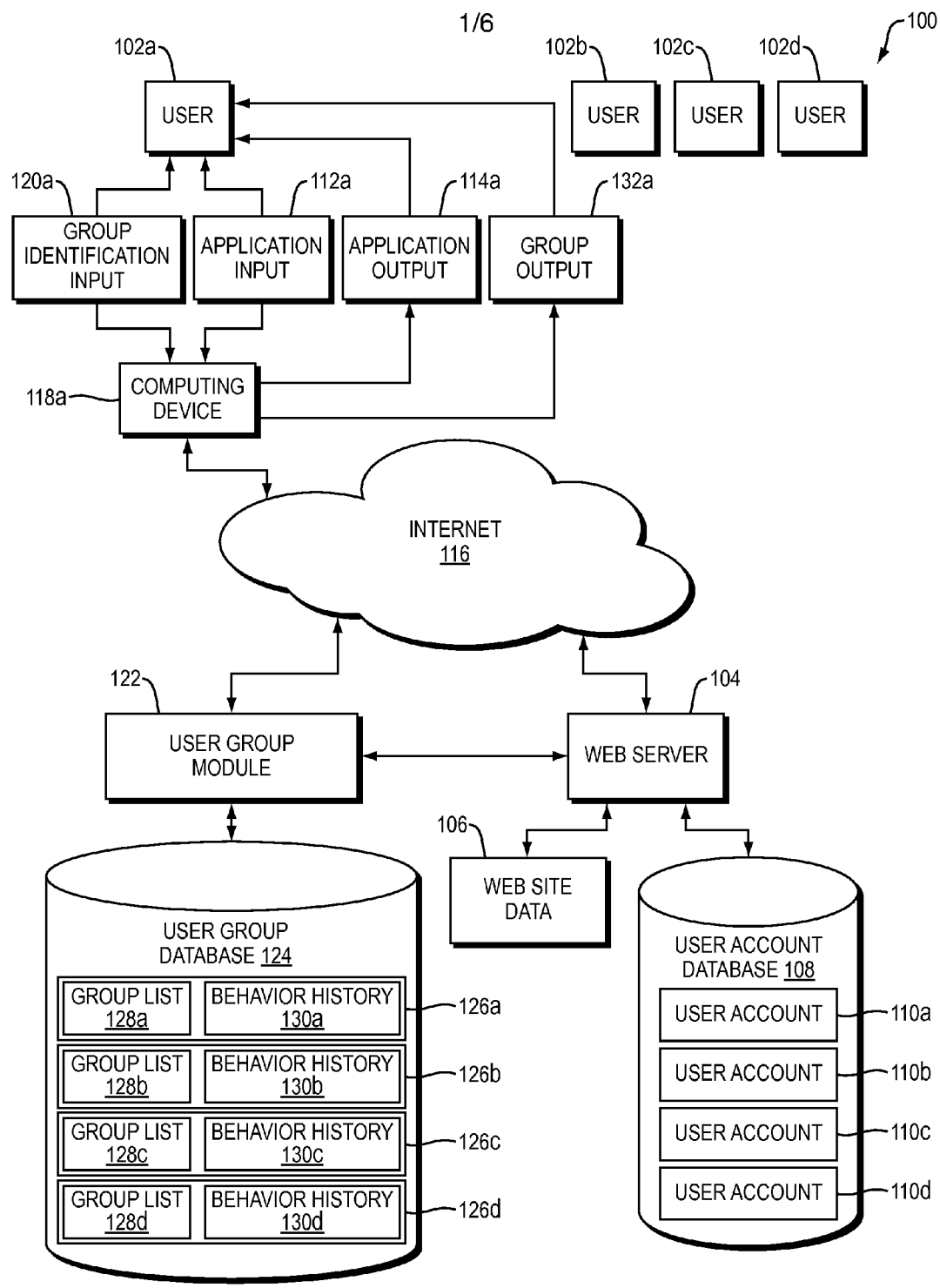
FIG. 1 is a dataflow diagram of a system for enabling users to join groups of similar users and to view information about the online behavior of such users according to one embodiment of the present invention.
Figure 2:
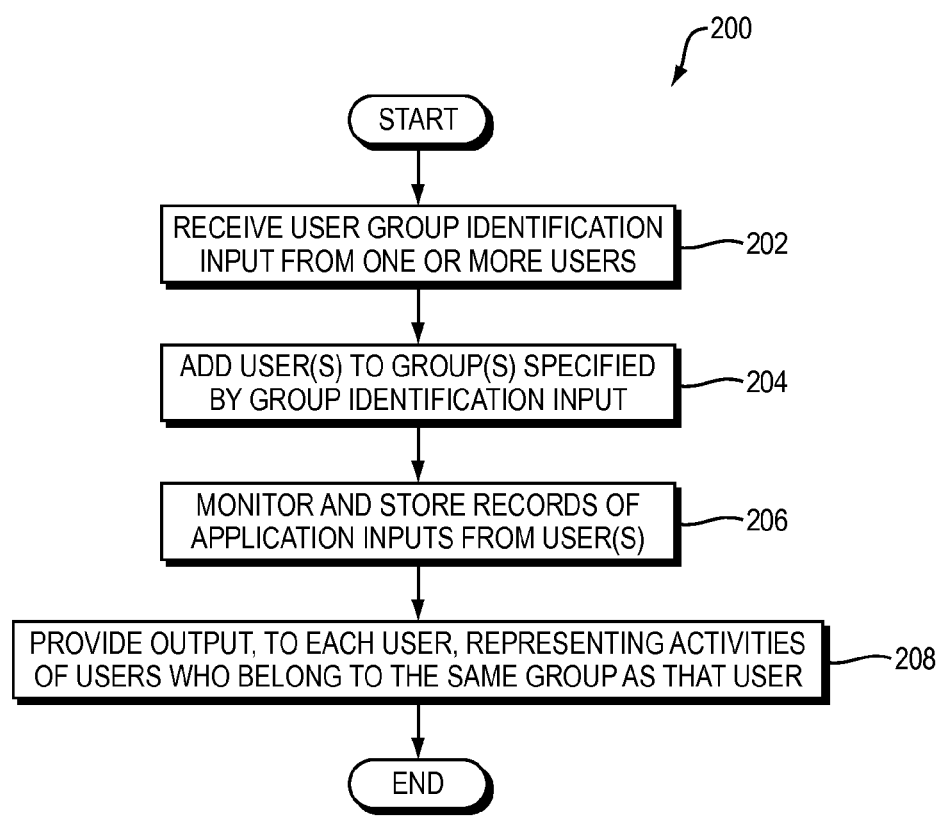
FIG. 2 is a flowchart of a method performed by the system of FIG. 1 according to one embodiment of the present invention.

Referring to FIG. 1, a dataflow diagram is shown of a system 100 for enabling users to join groups of similar users and to view information about the online behavior of such users according to one embodiment of the present invention. Referring to FIG. 2, a flowchart is shown of a method 200 performed by the system 100 of FIG. 1 according to one embodiment of the present invention.

A group of users may relate to a subject matter topic. The following description will use, as an example, various user groups relating to gardening, and having names such as NewToGardening, CityGardener, Tomato, Natural Garden, NewEngland, Container, ForTheKids, GnomeLover, GnomeHater, IHaveALawn, Herb, FormalGarden, EnglishGarden, Casual, Expert, and Organic. This particular topic and list of user groups is merely an example and does not constitute a limitation of the present invention. User groups implemented by embodiments of the present invention may relate to any topic(s), in any combination. Further, any particular user group need not relate to any particular topic. A group of users may relate to an entity. For example, members of a family may all join a particular user group for use by that family, even though the family members may or may not have any topical interests in common. As a result, such a user group may not relate to any particular topic(s). More generally, a user group may contain any arbitrary group of users. As will be described in more detail below, however, certain embodiments of the present invention in which users intentionally join one or more groups have particular advantages.

Any particular user group may have zero, one, or more members. A user group may have zero members when, for example, the user group is created by a web site owner, system administrator, or other user in anticipation of users joining that group, but before any users have joined the group. A user group may contain exactly one member when, for example, the user group is intended to represent an entity such as a celebrity or other high profile individual, and when the group contains only that individual, in which case embodiments of the present invention may prohibit anyone else from joining that group. A user group may contain two or more members when, for example, multiple users have provided input representing their desire to join that user group and have joined that user group as a result.

The system 100 may receive input from one or more users indicating the users' interest in joining a particular user group (FIG. 2, operation 202). For example, referring to FIG. 1, the system 100 includes users 102a-d. Although four users 102a-d are shown in FIG. 1 for ease of illustration and explanation, the system 100 may include any number of users. For example, the system 100 may include thousands or millions of users.

The users 102a-d may, for example, all be users of a single web site (such as an e-commerce web site) or other Internet application. For example, the system 100 of FIG. 1 is shown as containing a web server 104 of such a web site. The system 100 also includes web site data 106, which includes any data accessible to the web server 104 for use in rendering web pages to the users 102a-d. The web site data 106 may, for example, contain any combination of HTML, JavaScript, Java, PHP and other data and/or code for use by the web server 104 in serving pages of the web site to the users 102a-d.

Although FIG. 1 is shown as containing the web server 104, a web server is merely one example of an Internet application server. Not all Internet applications are web applications. For example, an Internet application may communicate over the Internet via a protocol other than HTTP and may provide output to, and receive input from, users via applications other than web browsers (such as non-browser applications executing on mobile computing devices). The term "Internet application" is used generally herein to refer both to web-based applications (such as the web site served by the web server 104 in FIG. 1) and non-web-based Internet applications. Therefore, any reference to the web server 104 in FIG. 1 should be understood to be applicable more generally to any Internet application, including non-web-based Internet applications.

The system 100 also includes user account data 108 containing data representing user accounts of the users 102a-d on the web site served by the web server 104. More specifically, user data 108 includes account data 110a for the account of user 102a, account data 110b for the account of user 102b, account data 110c for the account of user 102c, and account data 110d for the account of user 102d. The user account data 108 may include any account data conventionally used for web sites, such as usernames, passwords, viewing history, purchase history, wish lists, and preferences of the users 102a-d in connection with the web site served by the web server 104. The web server 104 may use any of a variety of techniques well-known to those having ordinary skill in the art to provide output to the users 102a-d (such as rendering web pages) and receiving input from the users 102a-d in accordance with both the web site data 106 and the user account data 108.

Although the system 100 of FIG. 1 includes only one web server 104 serving one web site, this is merely an example and does not constitute a limitation of the present invention. The system 100 may, for example, include multiple web servers in any combination, each with its own content data (e.g., web site data) and user account data. Each of the users 102a-d may interact with one or more of such web servers, and may have accounts with one or more of such web servers. For ease of illustration and explanation, however, the following description will focus on the example of FIG. 1, in which the system 100 includes only the single web server 104, which serves a single web site to users 102a-d.

In general, users 102a-d provide application input 112a-d, via respective computing devices 118a-d, to the web server 104 over the Internet and receive, via respective computing devices 118a-d, application output 114a-d from the web server 104 over the Internet. Application input 112a-d includes any conventional input that may be provided by a user to a web server or other Internet application, such as input representing URLs to which to navigate, clicks on URLs, text entered into text boxes, selection of menu items, and selections of checkboxes and radio buttons. Application input 112a-d, in other words, includes any of the conventional input used by users 102a-d to interact with the web pages served by the web server 104 to the users 102a-d.

In general, the web server 104 provides application output 114a-d over the Internet 116 to users 102a-d via computing devices 118a-d. Application output 114a-d includes any conventional output that may be provided to a user by a web server or other Internet application, such as web page HTML of web pages requested by the users 102a-d, for rendering by the web browsers (not shown) executing on the users' 102a-d computing devices 118a-d. For example, if user 102a-d types the URL of the home page of the web site served by web server 104 into a web browser executing on user 102a's computing device, the computing device 118a will transmit an HTTP request over the Internet 116 to the web server 104, in response to which the web server 104 will transmit application output 114a containing the requested web page over the Internet 116 to the user 102a's computing device 118a.

As mentioned above, the system 100 may receive input from one or more of the users 102a-d indicating the users' 102a-d interest in joining one or more particular user groups from among all users of an Internet application. This input from one or more of the users 102a-d may be an explicit input and may indicate an explicit interest on the part of the users 102a-d in joining one or more particular user groups. For example, user 102a may provide group identification input 120a (e.g., a group name or other group identifier) to user 102a's computing device 118a. The group identification input 120a indicates a selection, by the user 102a, of one or more user groups that the user 102a wishes to join. The group identification input 120a may take any of a variety of forms. However, the input selecting the group of users may not be an implicit categorization of a user as selecting the group of users, such as might occur when a user of an online shopping web site purchases a specific item (e.g., a book) and the web site associates that user with others who purchased the same item as a result of inferring that the input provided by the user when purchasing the book (e.g., clicking on a "buy" button) implicitly indicates that the user is a member of the group of users who have bought that book.

For example, the user 102a may provide the group identification input 120a as part of the application input 112a. In other words, the user 102a may provide the group identification input 120a as input to the web server 104 while browsing the web site served by the web server 104 (or, more generally, while interacting with the application served by an Internet application server). For example, if (as described in more detail below) the web server 104 serves a web page containing a "Join this group" button in connection with the display of content relating to an organic gardening group, and the computing device 118a renders that web page to the user 102a, the user 102a may provide the group identification input 120a as part of application input 112a which includes a click or tap on the "Join this group" button.

The user 102a need not, however, provide the group identification input 120a as part of the application input 112a. The user 102a may, for example, provide the group identification input 120a as input to an application other than the web site served by the web server 104, in which case the group identification input 120a may be received by a server other than the web server 104.

The system 100 also includes a user group module 122. In general, the user group module 122 manages the group membership of the users 102a-d and performs other functions related to user groups in the system 100. For example, in response to receiving the group identification input 120a from the user 102a over the Internet 116, the user group module 122 may update a user group database 124 to include data indicating that the user 102a has been added to the group indicated by the group identification input 120a, and that the user 102a therefore is now a member of that group (FIG. 2, operation 204). In embodiments of the present invention, the groups stored in the user group database 124 may be persistent beyond a single session. Accordingly, once a user joins a group, that user may remain a part of that group through multiple sessions until that user takes an affirmative step to be removed from that group.

The group identification input 120a may specify an existing group, in which case the user group module 122 may add the user 102a to the specified existing group. As another example, the group identification input 120a may specify a new (non-existing) group, in which case the user group module 122 may create the new group and then add the user 102a to the new group. As yet another example, the user group module 122 may create the new group specified by the group identification input 120a, but not add any users to that group initially. In this example, the user 102a may be a system administrator who creates the new group so that other users can join the group.

In general, the user group database 124 may include any of a variety of data that indicates, for each of the users 102a-d:

the group(s) of which the user is a member; and/or
the user's behavior history in connection with one or more Internet applications, such as the web site served by the web server 104.

For example, in the embodiment illustrated in FIG. 1, the user group database 124 includes user group records 126a-d corresponding to users 102a-d, respectively. The user group records 128a-d include: (1) user group lists 128a-d, respectively, indicating the group(s) of which the corresponding users 102a-d are members; and (2) behavior history data 130a-d representing the behavior history of users 102a-d, respectively, in connection with one or more Internet applications, such as the web site served by the web server 104. For example, user group record 126a includes: (1) user group list 128a, which indicates the zero, one, or more groups of which user 102a is a member, and (2) behavior history data 130a, which represents the behavior history of user 102a in connection with one or more Internet applications, such as the web site served by web server 104. User group record 126b includes similar data for user 102b, user group record 126c includes similar data for user 102c, and user group record 126d includes similar data for user 102d.

The user group database 124 may include data indicating which user(s) is/are members of particular groups. Such data may, for example, be distributed across the user group lists 128a-d. For example, if user 102a's group list 128a indicates that user 102a is a member of User Group A and user 102b's group list 128b indicates that user 102b is also a member of User Group A, this implies that User Group A includes both user 102a and user 102b. Although the system 100 may derive such information about the group membership of particular groups from the individual user group lists 128a-d, the system 100 may, additionally or alternatively, store user group membership data (not shown) indicating which users are members of each of one or more groups. Such data may be stored, for example, as separate user group membership list data in the user group database 124. Similarly, data representing the behavior history of users in particular groups may be stored within the user group records 126a-d and/or outside of such records 126a-d. Those having ordinary skill in the art will appreciate how to generate, store, and modify the various kinds of data disclosed herein in various ways other than those specifically illustrated in FIG. 1.

As described above, the user group module 122 may add a particular user to a particular group based on the group identification input received from that user. The group identification input 120a may represent the user 102a's express intent to join a group specified by the group identification input 120a. For example, the group identification input 120a may represent a selection by the user 102a of a "Join the organic gardening group" button or a "Join this group" button on a web page relating to organic gardening, in which case the user 102a's express intent is to join the organic gardening group.

Additionally or alternatively, however, the system 100 automatically make suggestions to users that they join particular groups. The system 100 may perform such automatic steps in any of a variety of ways. For example, the system 100 may observe that the user 102a has viewed a large number of products that were viewed and/or purchased by members of a particular group. In response to making this observation, the system 100 may suggest to the user 102a that he or she join the particular group. In such a case, the system 100 draws an inference that the user 102a may be interested in joining the particular group.

Although the description above refers to a single user (such as user 102a) joining a single group, the same or similar techniques may be repeated to enable a single user to join multiple groups (simultaneously or sequentially), and to enable each of a plurality of users (such as some or all of the users 102a-d) to join one or more groups.

As described above, users 102a-d may provide application input 112a-d to the web server 104. As further described above, the application input 112a-d may, for example, be any conventional input that may be provided by a user to a web server or other Internet application, such as input representing URLs to which to navigate, clicks on URLs, text entered into text boxes, selection of menu items, and selections of checkboxes and radio buttons.

The behavior of a group of users may be tracked in connection with the Internet Application. The user group module 122 may monitor some or all of the application input 112*a-d* and store a record of such application input 112*a-d* over time in the behavior history data 130*a-d* (FIG. 2, operation 206). Similarly, the user group module 122 may monitor some or all of the actions taken by the web server 104 in response to the application input 112*a-d* (such as web pages served to the users 102*a-d* in response to requests from those users 102*a-d* to navigate to those web pages) and store a record of such actions over time in the behavior history data 130*a-d*. Similarly, the user group module 122 may monitor some or all of the changes to the user data 108 in response to the application input 112*a-d* (such as purchases made by the users 102*a-d*) and store a record of such changes over time in the behavior history data 130*a-d*. The user group module 122 may store, in the behavior history data 130*a-d*, a record of associations between individual inputs in the application input 112*a-d* and corresponding actions taken by the web server 104 and corresponding changes to the user data 108.

For example, the user group module 122 may store, in the behavior history data 130*a-d*, any one or more of the following:
content viewed by the users 102*a-d* (such as web pages viewed and products viewed);
content, products, and/or services viewed, purchased, and/or shared by the users 102*a-d*;
messages sent and/or received by the users 102*a-d*;
ratings (such as ratings of products and/or services) provided by the users 102*a-d*.

The user group module 122 may monitor and store data related to any of the above. For example, when the user group module 122 detects that a particular user has viewed a web page on which a particular product is sold, the user group module 122 may identify and store any of a variety of data related to that web page, such as:
the URL of the web page;
data identifying the product offered for sale on the web page (such as any one or more of the name, manufacturer, brand, size, style, and price of the product);
data identifying the amount of time spent by the particular user on the web page;
data indicating whether the user viewed additional details about the product and, if so, which detail the user viewed;
data indicating whether the user drilled down into the product view further to view additional details such as pictures of the product;
data indicating whether the user shared the web page with other users and, if so, data identifying the users with which the user shared the web page;
data indicating whether the user added the product to a shopping cart;
data indicating whether the user rated and/or wrote a review of the product and, if so, data representing such a rating and/or review; and
data indicating whether the user purchased the product via the web page.

The user group module 122 may monitor and store similar data for content (such as article, songs, and videos) viewed by users. In addition, with respect to such content, the user group module 122 may identify and store the name of the article or other content; the author, composer, directory, producer, publisher, and/or performer of the article or other content; and the topic/category of the article or other content.

The user group module 122 may monitor and store individual instances of behaviors (such as individual clicks, page views, and pages). Additionally or alternatively, the user group module 122 may derive and store statistics based on such individual instances of behaviors. For example, the user group module may derive, from individual purchases of a particular product by members of a particular group, the total number of such purchases, and store such a total number of purchases in association with the group. As other examples, the user group module 122 may derive and store statistics, such as maximum values, minimum values, arithmetic means, and standard deviations, of any of the behavioral data disclosed herein.

Figure 3A:
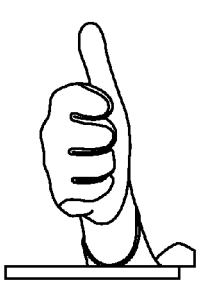

The user group module 122 may use any of the individual behavior data and/or aggregate (statistical) behavior data to perform any of a variety of functions, such as developing measures of a group's interest in a particular product or other content (such as may be represented and displayed to users via the bars shown in FIG. 3A). For example, the user group module 122 may increase the length of a bar associated with a particular product and group as a function of the number of page views and purchases of that product by members of the group.

As illustrated in FIG. 1, each record of a particular behavior engaged in by a particular user may be stored in a user group record associated with that particular user. For example, behavior of user 102*a* (such as web pages viewed by user 102*a*) may be stored in the behavior history data 130*a* of user 102*a*'s user group record 126*a*. More generally, the system 100 may store a record of a particular user's behavior in any way that associates such a record with that particular user, so that the record of the user's behavior may later be accessed and be identified as being associated with that particular user.

The tracking of the behavior of the group of users may be repeated so as to update information representing the tracked online behavior of the group of users. Any record of a user's behavior may also include data representing a time at which the behavior was performed. Any record of a user's behavior may also include data indicating whether the user currently is engaging in that behavior. The system 100 may periodically, continuously, or otherwise repeatedly receive updates to the behavioral inputs 112*a-d* (such as new behavioral inputs 112*a-d* received from the users 102*a-d* over time as they browse the web site served by the web server 104) and update the behavioral history data 130*a-d* to reflect such updated behavioral inputs 112*a-d*. Such updates may be performed in real-time or substantially in real-time. For example, such updates may be performed every one or more seconds, every one or more minutes, every one or more hours, every one or more days, or another measure of time.

In response to detecting or otherwise determining that a particular user currently is engaging in a particular behavior, the system 100 may update the behavioral history data 130*a-d* to indicate that the particular user currently is engaging in that particular behavior. In response to detecting or otherwise determining that the particular user no longer is engaging in a particular behavior in which the particular user previously was engaged, the system 100 may update the behavioral history data 130*a-d* to indicate that the particular user no longer is currently engaging in that particular behavior. The determination of whether the particular user currently is engaging in a particular behavior or is no longer engaging in a particular behavior may made be made with respect to a particular instance in time, or may be made with respect to a particular time period. The particular time period may be for a period of time less than a total period of time for which the behavior has been tracked. The particular time period may, for example, be one or more days, one or more weeks, one or more months, one or more years, or another measure of time. The measure of time may be static (such as a fixed duration of, for example, one month) or dynamic based on other factors.

The user group module 122 may also provide, to each of one or more of the users 102a-d, output 132a-d representing one or more activities currently being performed and/or previously performed by users who are in the same group(s) as that user (FIG. 2, operation 208). For example, the user group module 122 may provide (e.g., display), to user 102a, group output 132a representing one or more activities currently and/or previously engaged in by users who are members of the same group(s) as user 102a. For example, if user 102a is a member only of Group A, and of the remaining users 102b-d, only users 102b and 102c are also members of Group A, then the group output 132a provided to the user 102a may represent activities of users 102b-c, but not activities of user 102d, because user 102d is not a member of any of the same groups as user 102a.

The group output that is provided to a particular user may, therefore, represent activities of fewer than all of the users 102a-d of the system. Stated differently, the information representing the tracked online behavior of the group of users may not include information representing the tracked online behavior of users outside of the group of users. Furthermore, although the group output that is provided to a particular user may represent activities of users who are members of all of the groups of which the particular user is a member, this is merely an example and does not constitute a limitation of the present invention. Alternatively, for example, the group output that is provided to a particular user may include only data representing activities of members of a subset of the groups of which the particular user is a member. For example, if user 102a is a member of Groups A and B, the group output 132a provided to user 102a at a particular time may include only data representing activities of members of Group A, but not any data representing activities of members of Group B.

Providing a particular user with group output may, therefore, include: (1) identifying one or more groups of which the particular user is a member; (2) identifying one or more users (possibly including the particular user) who are members of the same groups as the particular user; and (3) generating and providing the particular user with data representing activities of only those users who are members of the same groups as the particular user.

The group output 132a-d provided by the user group module 122 to users 102a-d of the system 100 may also include information about existing groups maintained by the system. For example, and as described in more detail below, the system 100 may, at appropriate times, provide the users 102a-d with the names of one or more existing groups maintained by the system 100. The users 102a-d may provide the group identification input 120a-d, to indicate their desire to join one or more particular groups, in response to being provided with such names of existing groups.

Individual users may provide input to the system 100 specifying which of their inputs 112a-d may be monitored by the system 100, and which of such inputs 112a-d may be shared with other users of the system 100. The system 100 may then only monitor and share the behaviors of the users 102a-d in accordance with their specified preferences. For example, user 102a may provide input specifying that the system 100 may monitor and share information about products purchased by the user 102a, but not information about web pages viewed by the user 102a. In response, the system 100 may only monitor and share information about products purchased by the user 102a, but not information about web pages viewed by the user 102a.

Recall that the users 102a-d may interact with more than one Internet application. The group data that the user group module 122 provides to a particular user at a particular time may include, or consist of, data representing activities of other users in connection with an Internet application with which the particular user is currently interacting. For example, consider a case in which the system 100 monitors and stores behavioral history data 130a-d representing actions performed by the users 102a-d not only on the web site served by the web server 104, but also actions performed by the users 102a-d in connection with other Internet applications (such as other web sites). In such a case, while the user 102a is interacting with the web site served by the web server 104 (e.g., while the user 102a is logged in to that web site, or while the user 102a is viewing pages on that web site), the user group module 122 may provide to the user 102a group output representing only the activities of other users in connection with that web site, and not group output representing activities of users in connection with other web sites.

Having generally described various embodiments of the present invention, certain particular embodiments of the present invention will now be described by reference to the example user interfaces of FIGS. 3A-3D.

Referring to FIG. 3A, an illustration is shown of a user interface for a e-commerce web site which sells gardening products. As is typical with e-commerce web sites, the web site illustrated in FIG. 3A enables users to browse through, search for, view, and purchase products. The web site illustrated in FIG. 3A is also, however, enhanced by features of embodiments of the present invention. For example, the web site illustrated in FIG. 3A shows the user who is browsing the web site (referred to herein as the "current user") how interested other users who are members of the same group(s) as the current user are in the products displayed on the web site. In particular, in FIG. 3A, the bar next to each product listing represents the level of interest that the groups of which the current user is a member have in the product. Furthermore, in FIG. 3A, the tags at the bottom of the user interface (e.g., #Mom, #NewEngland, #TomatoGarden, and #Outdoors) are the names of user groups of which the current user is a member.

Figure 3B:
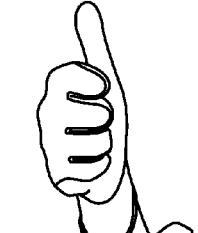

The user interface of FIG. 3B shows information that is displayed if the current user hovers the mouse cursor over a particular green bar next to a particular product, namely: the number of people in the current user's groups who are currently viewing the particular product, the names of groups who particularly liked the particular product, and the level of interest of each of those groups in the particular product. Recall that the determination of whether other users are, for example, currently viewing a particular product may be made with respect to a particular instance in time, or may be made with respect to a particular time period, such as within the past 30 seconds. Similarly, the determination may be updated periodically.

Figure 3C:
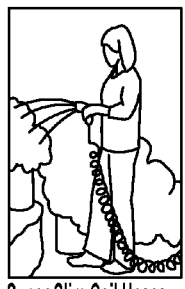
Figure 3D:
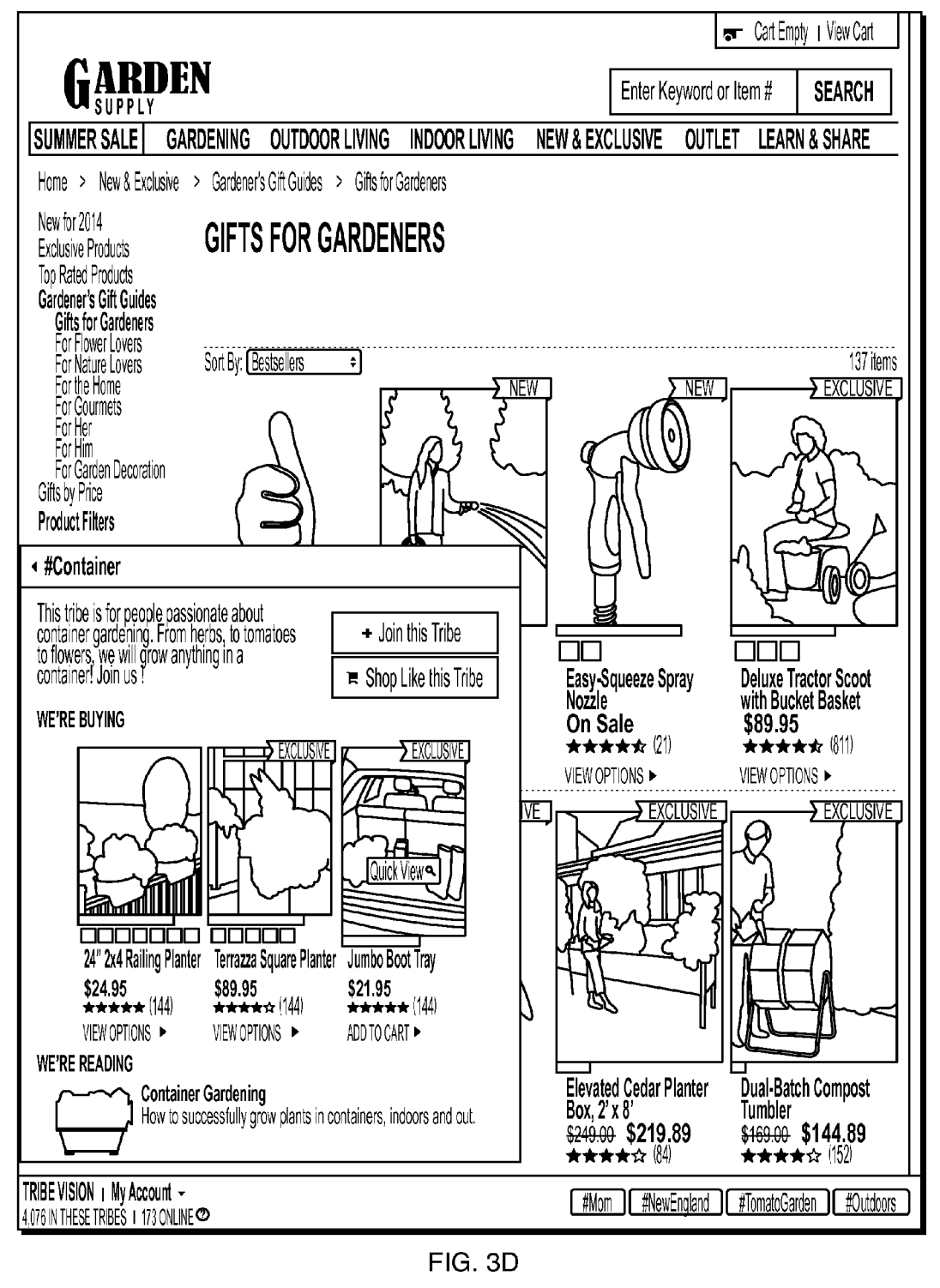

The user interface of FIG. 3C shows the product detail page for a particular product. The product detail page shows which user groups most like the product. Furthermore, if the current user hovers the mouse cursor over the name of a particular user group, additional information about that user group is displayed to the current user, such as: how popular the product is with the user group, how many people in that user group have viewed the product, which percentage of people in that user group have purchased the product, and which products people in the user group also purchased. The product detail page also provides the current user with an opportunity to join the user group.

The current user may click on, or otherwise select, the name of a user group wherever such a name appears in the user interfaces of FIGS. 3A-3C. In response to such a selection, the current user may be shown a user interface such as that shown in FIG. 3D, which shows the current user a description of the selected user group, information about what the selected user group is buying, information about what the selected user group is reading, and a button which enables the current user to join the selected user group.

The user group module 122 may identify associations between content/products and a group based on the behavior of members of the group. For example, if the user group module 122 determines, using any of the techniques disclosed herein, that members of a particular group engage in behavior which satisfies some predetermined criterion in connection with particular content or a particular product, the user group module 122 may create an association between that group and the particular content/product. Examples of such criteria include viewing, purchasing, or sharing the content/product very frequently (e.g., more than a particular number of times or more frequently than other groups). The user group module 122 may display such associations to users 102a-d of the system 100 in any of a variety of ways. For example, the user group module 122 may display output indicating that a particular product is a "favorite" product of a particular group if the user group module 122 has created an association between the product and group based on any of the behaviors described above.

Additionally or alternatively, the user group module 122 may recommend particular content/products to a particular user based on the behavior of groups of which the particular user is a member. For example, as described above, the user group module 122 may create an association between a particular group and particular content or a particular product. The user group module 122 may identify content/products associated with a particular group and recommend the identified content/products to one or more members of the particular group. For example, the user group module 122 may recommend that a particular user view and/or purchase a particular product that has been viewed and/or purchased frequently by members of one or more groups of which the particular user is a member.

Embodiments of the present invention have a variety of advantages, such as the following. Embodiments of the present invention enable users of web sites and other Internet applications to see what other people who are like them are reading, purchasing, and otherwise doing on such sites. In contrast, although e-commerce web sites provide information to users about other users (such as what products other users have purchased and what ratings other users have assigned to products), such information is not filtered or segmented to include only information about users who are similar to the current user in some way. Instead, a user visiting a conventional e-commerce site is presented with information about, for example, which products are most popular among the entire population of the site, and what the average rating of a product is among the entire population of the site. In contrast, embodiments of the present invention enable a particular user to see information which has been filtered to include only information derived from the online activities of other users who are similar to or otherwise grouped with the particular user in some way, as defined by the shared group membership of the particular user and the other users.

Such filtering provides users with information which is likely to be more relevant, and therefore more useful, to users than unfiltered information about an entire population of users. People typically want to learn from and share with people who are similar to them, not necessarily with everyone. This is particularly true when the population (e.g., the number of user accounts on a web site) is very large and/or when the amount of information (e.g., the number of products available for purchase on a web site) to be viewed and analyzed is very large. In such circumstances, users are more likely to benefit from information about the online behavior of only that subset of users who are similar to or otherwise grouped with them.

Furthermore, embodiments of the present invention enable users to view information in a particular web site about the online behavior (e.g., viewing and/or purchasing activity) in which similar users engaged on that same web site. For example, a user may visit an e-commerce web site and view, from within that e-commerce web site, information about the online behavior in which other, similar, users engaged on that same web site. As a result, embodiments of the present invention enable users to obtain relevant information about the behavior of similar users without having to leave the web site to which that information is relevant. This feature of embodiments of the present invention addresses the current problem of users of e-commerce sites leaving such sites and going to social networking sites in order to engage with similar users in conversations about products for sale on the e-commerce sites. Embodiments of the present invention address this problem by merging the user experience within a web site (such as an e-commerce web site) with the social experience typically only find in sites specifically devoted to social networking.

Although technologies exist for monitoring, storing, and reporting on online user behavior, such technologies typically only provide user behavior information to site administrators. Embodiments of the present invention expose such information to end users themselves. Furthermore, embodiments of the present invention do not merely expose any and all user behavior information to all users. Instead, embodiments of the present invention only provide each user with user behavior information derived from the online behavior of users who are members of the same groups as that user. This feature limits the scope of information that is provided to users, both to provide users with segmented information that is more likely to be relevant to them than information about an entire population of users, and to protect the privacy and respect the preferences of users in connection with their online behavior.

Furthermore, embodiments of the present invention may update its repository of online user behavior data continuously and in real-time, as users continue to interact with web sites and other Internet applications. Such updated data may then be used to provide users with real-time or substantially real-time information about the online activities of users in their groups. Such real-time updating enables users to analyze information and make decisions (such as product purchasing decisions) based on the latest information, but without the need to seek out or update such information themselves, since such information is pushed to users automatically as they browse web sites and otherwise interact with Internet applications.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions. For example, any of the functions disclosed herein as being performed by the user group module 122 and the web server 104 may be further subdivided into additional components for performing those functions, and/or combined into fewer components for performing those functions. For example, some or all of the functions disclosed herein as being performed by the user group module 122 may be performed instead by the web server 104 itself.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

What is claimed is:

1. A method performed by at least one computer processor executing computer program instructions stored on at least one non-transitory computer-readable medium, the method comprising:
   (A) receiving, from a particular user, an input selecting a group of users from among all users of an Internet application;
   (B) adding the particular user to the group of users;
   (C) tracking online behavior currently being engaged in by the group of users, including the particular user, wherein the online behavior comprises input provided by the group of users to the Internet application; and
   (D) displaying, to the particular user, within a user interface of the Internet application, information representing the tracked online behavior currently being engaged in by the group of users,
   wherein said information representing the tracked online behavior of the group of users does not include information representing tracked online behavior of users outside of the group of users.

2. The method of claim 1, wherein said group of users is persistent beyond a session.

3. The method of claim 1, further comprising:
   (E) repeating step (C) so as to update said information representing the tracked online behavior of the group of users.

4. The method of claim 3, wherein (E) is performed in real-time or substantially real-time.

5. The method of claim 3, wherein said information representing the tracked online behavior of the group of users includes information representing amounts of time users in the group of users have engaged in the tracked online behavior.

6. The method of claim 1, wherein the input selecting a group of users is an explicit input that represents an explicit interest of the user in joining the group of users.

7. The method of claim 1, wherein the input selecting the group of users is not an implicit categorization of said particular user as selecting the group of users.

8. The method of claim 1, wherein (C) further comprises:
   (C) (1) tracking online behavior of the group of users, including the particular user, in connection with another Internet application.

9. The method of claim 8, wherein said information representing the tracked online behavior of the group of users does not include information representing the tracked online behavior of the group of users in connection with the another Internet application.

10. The method of claim 1, wherein (A) further comprises:
    (A) (1) creating said group of users based on said input selecting said group of users.

11. The method of claim 1, wherein the group comprises a single member.

12. The method of claim 1, wherein the group comprises two or more members.

13. The method of claim 1, wherein said group of users relates to one or more of a subject matter topic and an entity.

14. The method of claim 1, wherein the Internet application comprises a web-based application.

15. The method of claim 14, wherein the web-based application comprises a website.

16. The method of claim 1, wherein the tracked online behavior of the group of users comprises one or more of content viewed, purchases, shares, and ratings.

17. The method of claim 1, wherein (C) comprises:
(C) (1) storing as first data representing the tracked online behavior of the group of users, a product or content identifier for a product or a content item;
(C) (2) storing as second data representing the tracked online behavior of the group of users, interactions with the Internet application with respect to the product or the content item.

18. The method of claim 17, wherein the product or content identifier comprises a URL or data identifying the product.

19. The method of claim 17, wherein the interactions with the Internet application with respect to the product or the content item comprise one or more of viewing additional details about the product or content item, sharing the product or content item, adding the product or content item to an online shopping cart, rating/reviewing the product or content item, and purchasing the product or content item.

20. A system comprising at least one non-transitory computer-readable medium having stored thereon computer program instructions executable by at least one computer processor to perform a method, the method comprising:
(A) receiving, from a particular user, an input selecting a group of users from among all users of an Internet application;
(B) adding the particular user to the group of users;
(C) tracking online behavior currently being engaged in by the group of users, including the particular user, wherein the online behavior comprises input provided by the group of users to the Internet application; and
(D) displaying, to the particular user, within a user interface of the Internet application, information representing the tracked online behavior currently being engaged in by the group of users,
wherein said information representing the tracked online behavior of the group of users does not include information representing tracked online behavior of users outside of the group of users.

21. The system of claim 20, wherein said group of users is persistent beyond a session.

22. The system of claim 20, wherein the method further comprises:
(E) repeating step (C) so as to update said information representing the tracked online behavior of the group of users.

23. The system of claim 22, wherein (E) is performed in real-time or substantially real-time.

24. The method of claim 22, wherein said information representing the tracked online behavior of the group of users includes information representing amounts of time users in the group of users have engaged in the tracked online behavior.

25. The system of claim 20, wherein the input selecting a group of users is an explicit input that represents an explicit interest of the user in joining the group of users.

26. The system of claim 20, wherein the input selecting the group of users is not an implicit categorization of said particular user as selecting the group of users.

27. The method of claim 20, wherein (C) further comprises:
(C) (1) tracking online behavior of the group of users, including the particular user, in connection with another Internet application.

28. The system of claim 27, wherein said information representing the tracked online behavior of the group of users does not include information representing the tracked online behavior of the group of users in connection with the another Internet application.

29. The system of claim 20, wherein (A) further comprises:
(A) (1) creating said group of users based on said input selecting said group of users.

30. The system of claim 20, wherein the group comprises a single member.

31. The system of claim 20, wherein the group comprises two or more members.

32. The system of claim 20, wherein said group of users relates to one or more of a subject matter topic and an entity.

33. The system of claim 20, wherein the Internet application comprises a web-based application.

34. The system of claim 33, wherein the web-based application comprises a website.

35. The system of claim 34, wherein the tracked online behavior of the group of users comprises one or more of content viewed, purchases, shares, and ratings.

36. The system of claim 20, wherein (C) comprises:
(C) (1) storing as first data representing the tracked online behavior of the group of users, a product or content identifier for a product or a content item;
(C) (2) storing as second data representing the tracked online behavior of the group of users, interactions with the Internet application with respect to the product or the content item.

37. The system of claim 36, wherein the product or content identifier comprises a URL or data identifying the product.

38. The system of claim 36, wherein the interactions with the Internet application with respect to the product or the content item comprise one or more of viewing additional details about the product or content item, sharing the product or content item, adding the product or content item to an online shopping cart, rating/reviewing the product or content item, and purchasing the product or content item.

* * * * *

UNITED STATES PATENT AND TRADEMARK OFFICE
CERTIFICATE OF CORRECTION

PATENT NO. : 9,871,877 B2  Page 1 of 1
APPLICATION NO. : 14/820660
DATED : January 16, 2018
INVENTOR(S) : Wirth et al.

It is certified that error appears in the above-identified patent and that said Letters Patent is hereby corrected as shown below:

In the Specification

In Column 4, Line 36, delete "user" and insert -- users --, therefor.

In Column 5, Line 61, delete "records 128a-d" and insert -- records 126a-d --, therefor.

In Column 8, Line 43, delete "behavioral" and insert -- application --, therefor.

In Column 8, Line 43, delete "behavioral" and insert -- application --, therefor.

In Column 8, Line 47, delete "behavioral" and insert -- application --, therefor.

In Column 10, Line 30, delete "a" and insert -- an --, therefor.

In the Claims

In Column 14, Line 60, Claim 9, delete "with the" and insert -- with --, therefor.

In Column 16, Line 1, Claim 24, delete "method" and insert -- system --, therefor.

In Column 16, Line 12, Claim 27, delete "method" and insert -- system --, therefor.

In Column 16, Line 21, Claim 28, delete "with the" and insert -- with --, therefor.

Signed and Sealed this
First Day of May, 2018

Andrei Iancu
*Director of the United States Patent and Trademark Office*